United States Patent [19]

Grasshoff

[11] 4,021,417

[45] May 3, 1977

[54] POLYMERIZATION OF SULFUR CONTAINING COMPOUNDS IN AQUEOUS MEDIA UTILIZING A TETRA-ALKYLATED AZO-BIS-ACETONITRILE

[75] Inventor: J. Michael Grasshoff, Hudson, Mass.

[73] Assignee: Polaroid Corporation, Cambridge, Mass.

[22] Filed: Aug. 4, 1975

[21] Appl. No.: 601,364

Related U.S. Application Data

[63] Continuation-in-part of Ser. No. 520,982, Nov. 5, 1974, which is a continuation-in-part of Ser. No. 429,928, Jan. 2, 1974, abandoned.

[52] U.S. Cl. .................................. 260/79.7; 260/8; 260/79

[51] Int. Cl.$^2$ ......................................... C08F 28/02

[58] Field of Search ............................ 260/79, 79.7

[56] References Cited

UNITED STATES PATENTS

| | | | |
|---|---|---|---|
| 2,832,756 | 4/1958 | Melamed | 260/77.5 |
| 3,260,748 | 7/1966 | Nelson, Jr. | 260/564 |

*Primary Examiner*—Melvyn I. Marquis
*Attorney, Agent, or Firm*—Esther A. H. Hopkins

[57] ABSTRACT

High molecular weight, sulfur containing compounds are prepared by polymerization of their monomeric precursors in an aqueous medium with a tetra-alkylated azo-bis-acetonitrile catalyst.

6 Claims, No Drawings

POLYMERIZATION OF SULFUR CONTAINING COMPOUNDS IN AQUEOUS MEDIA UTILIZING A TETRA-ALKYLATED AZO-BIS-ACETONITRILE

CROSS-REFERENCE TO RELATED PATENT APPLICATIONS

This is a continuation-in-part of U.S. application Ser. No. 520,982 filed Nov. 5, 1974 which is a continuation-in-part of U.S. application Ser. No. 429,928 filed Jan. 2, 1974 and now abandoned.

BACKGROUND OF THE INVENTION

The present invention is concerned with a novel method of polymerizing sulfur containing compounds in an aqueous medium.

Preparation of certain high molecular weight sulfur containing polymers has proven extremely difficult because sulfur which is not in its highest oxidation state scavenges radicals during the polymerization process so as to stop growth of the polymeric chain. In addition, cross-linking may readily occur due to formation of disulfide bridges between polymer chains. As disclosed in U.S. application Ser. No. 520,983 entitled, "Novel Polymeric Derivatives of Tetrazole-5-Thiols and Their Metal and Ammonium Salts" and filed by M. J. Grasshoff and J. L. Reid, now U.S. Pat. No. 3,936,401 a monomer linked to a tetrazole-5-thiol can be polymerized in an organic medium if the tetrazole's sulfur substituent is first masked. The extra steps of masking and unmasking the sulfur substituent in a compound such as this are of course undesirable.

OBJECTS OF THE INVENTION

It is therefore a primary object of this invention to provide a novel method of polymerizing the monomeric substituent of sulfur containing compounds without masking the sulfur.

Other objects, features and advantages of this invention will be obvious or will appear hereinafter.

SUMMARY OF THE INVENTION

It has now been found that the monomeric substituents of sulfur containing compounds which have a resonance stabilized group adjacent to the monomeric substituent and which form an alkali salt in an aqueous medium can be polymerized in that medium in the presence of a tetra-alkylated azo-bisacetonitrile catalyst without masking the sulfur.

DETAILED DESCRIPTION OF THE INVENTION

Illustrative of the sulfur containing compounds polymerized in the manner of this invention are those selected from the following group:

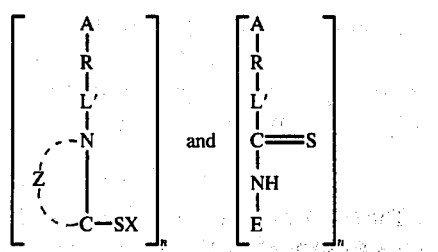

wherein A is an ethylenically unsaturated substituent which has been polymerized, R is a resonance stabi-lized group, L' is an optional linking group, X is hydrogen, ammonium or metal, $\overline{Z}$ represents the atoms and bonds necessary to complete a tetrazole ring structure, E is hydrogen, alkyl or aryl non-functional in polymerization and n is an integer of at least 100. A "resonance stabilized group" is a group of connected atoms with more stability than might be expected from isolated doublebonds because of delocalization of electrons through the structure. Breslow in "Organic Reaction Mechanisms" published by W. A. Benjamin in 1966, on page 7 states, "Resonance interaction between canonical (hypothetical) structures is stabilizing. The more resonance forms (stable pairing schemes) can be written for any molecule, the more stabilized the actual compound will be . . . .". "Linking" is used in its sense of "connecting".

Among the types of compounds which may be polymerized are those of the formulae:

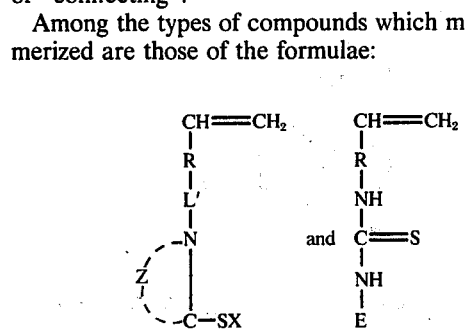

As discussed in aforementioned U.S. patent application Ser. No. 520,983 with regard to tetrazole-5-thiols, the polymerized derivatives of such compounds may be used in their alkali salt form as gelatin thickeners for a photographic emulsion.

Preparation of these compounds is effected by polymerizing their alkali salt form in an aqueous medium in the presence of a tetra-alkylated azo-bis-acetonitrile catalyst. This polymerization process is preferably carried out at elevated temperature under deaerated conditions.

The polymerizable compounds may be represented by:

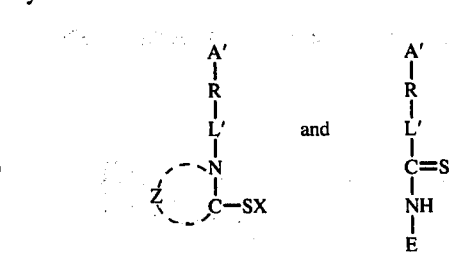

wherein A' is an ethylenically unsaturated substituent such as vinyl, acrylamido, (2-acrylamido-2-methyl) propionamido. Their salt or thiolate form may be represented by the structure:

wherein T represents the atoms and bonds necessary to complete the compound. When the sulfur carrying carbon is adjacent to a nitrogen atom, then this salt may be represented by the thiolate-azeniate resonance structure:

Included among the various compounds which may be made by the process of this invention are:

poly[1-(p-vinylbenzyl)-1,2,3,4-tetrazole-5-thiol],

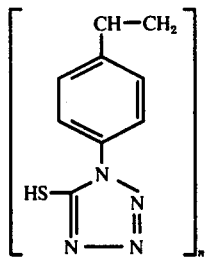

poly [1-(p-vinylbenzyl)-1,2,3,4-tetrazole-5-thiol],

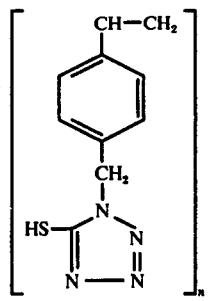

poly[1-(m-acrylamidophenyl)-1,2,3,4-tetrazole-5-thiol],

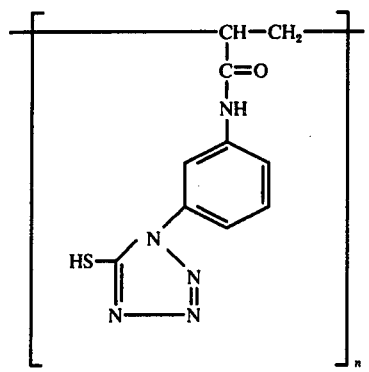

poly[1-(m-2-acrylamido-2-methyl)-propionamidophenyl)-1,2,3,4-tetrazole-5-thiol],

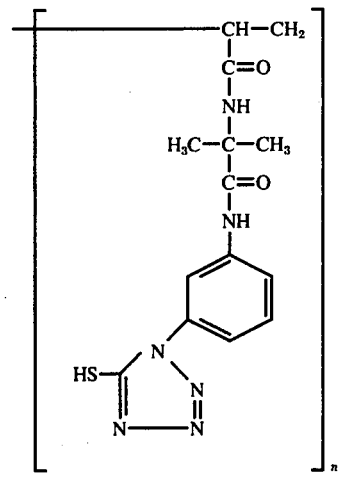

poly[N-(p-vinylphenyl)-N-ethyl-thiourea],

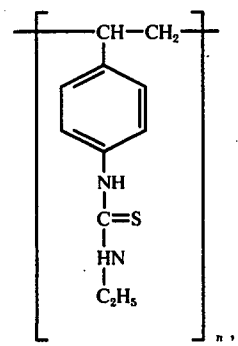

and
poly[(p-vinylphenyl)-thiourea],

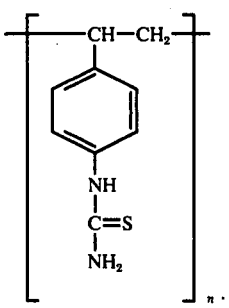

The process of polymerizing the alkali salt precursors of compounds such as these is illustrated in the following examples which are given for illustrative purposes only and are not intended to limit the invention's scope.

EXAMPLE 1

The potassium salt of poly[1-(p-vinylphenyl)-1,2,3,4-tetrazole-5-thiol] was prepared in the following manner. 20 g of freshly crystallized 1-(p-vinylphenyl)-1,2,3,4-tetrazole-5-thiol,

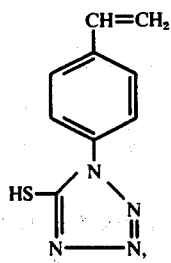

were dissolved in a solution of 13 g of potassium carbonate in 150 ml of distilled water to yield the potassium salt of the mercaptotetrazole. The resultant clear solution was transferred to a polymerization tube containing 40 mg of 2,2'-azo-bis-2(methylpropionitrile) where it was deaerated and heated at 60° C for 16 hours. During this period, polymerization took place with a steady increase in viscosity. Dialysis for 2 days and subsequent freeze drying yielded an 80% yield of the potassium salt of poly[1-(p-vinylphenyl)-1,2,3,4-tetrazole-5-thiol],

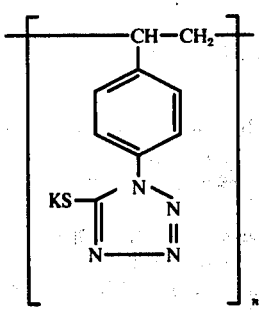

As in the following examples, this salt may be converted to the thiol by acidification, as by the addition of HCl.

EXAMPLE 2

The potassium salt of poly[1-(p-vinylbenzyl)-1,2,3,4-tetrazole-5-thiol] was prepared in the following manner. 4 g of 1-(p-vinylbenzyl)-1,2,3,4-tetrazole-5-thiol,

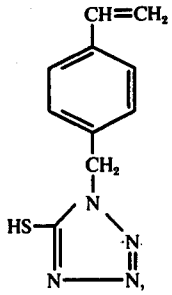

were dissolved in 3 ml of water containing 4 g of potassium carbonate and 20 mg of 2,2'-azo-bis-(2-methylpropionitrile) and then heated for 16 hours in a sealed tube to yield a viscous solution of the polymerized product. This was dialyzed for 20 hours and freeze dried to yield 4.2 g of the potassium salt of poly[1-(p-vinylbenzyl)-1,2,3,4-tetrazole-5-thiol],

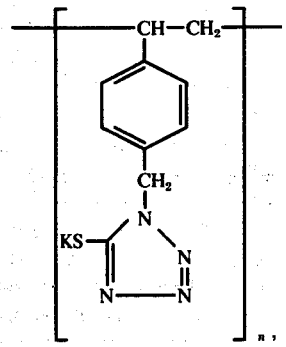

EXAMPLE 3

The potassium salt of poly[1-(m-acrylamidophenyl)1,2,3,4-tetrazole-5-thiol] was prepared in the following manner. 1.1g of 1-(m-acrylamidophenyl)-1,2,3,4-tetrazole-5-thiol,

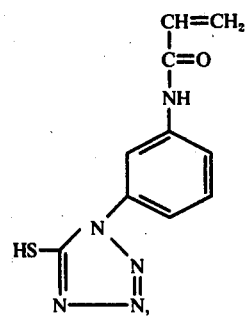

were dissolved in 15 ml. of water containing 1 g of potassium carbonate. This solution was filtered and then heated at 60° C for 24 hours in a polymerization tube containing 5 mg. of 2,2'-azo-bis-2(methylpropionitrile). Upon dialysis and freeze-drying, 0.8 g of white, fluffy poly[1-m-acrylamidophenyl)-5-tetrazole-5-thiol],

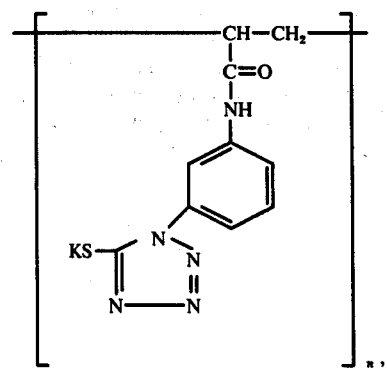

was obtained. Elemental analysis of the polymerized product (calculated for $C_{10}H_9N_5OS$) indicated actual yields of C: 48.0; H: 3.9; N: 28.3 and S: 12.5 as compared to theoretical yields of C: 48.4; H: 3.6; N: 28.3 and S: 12.9.

Although potassium salts were prepared in the above examples, other metal salts, especially those from Groups 1A, 1B, 2A and 8 through period 4 and Group 2B of the Periodic Table of Elements such as sodium, copper, lithium, zinc, nickel and cobalt, as well as an ammonium salt, can of course, be prepared. Polymerizable substituents such as, for example, isopropenyl, acrylamido, (2-acrylamido-2-methyl) propionamido may be utilized in lieu of a vinyl group, while resonance stabilized groups other than the phenyl group such as, for example, naphthyl, may of course be utilized as long as the group chosen does not interfere with the polymerization reaction. In addition, the starting materials and polymerized products may contain substituents other than those previously mentioned as may be readily selected by those skilled in the art. When heating is employed during the polymerization process, the amount desired of course depends upon the particular catalyst employed, but a temperature range of 50° to 80° C is generally preferred. While other tetra-alkylated azo-bisacetonitrile catalysts may be used in place of 2,2'-azo-bis-[2-methyl-propionitrile], this catalyst is preferred.

Since other substitutions and changes may be made in the above process without departing from the scope of the disclosed invention, it is intended that all matter in the foregoing description shall be interpreted as illustrative and not in a limiting sense.

What is claimed is:

1. The process of polymerizing an alkali metal salt of the compounds selected from:

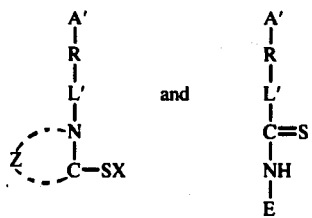

wherein A' is an ethylenically unsaturated substituent, R is a resonance stabilized group, L' is an optional linking group, x is hydrogen, ammonium or metal, $Z$ represents the atoms and bonds necessary to complete a tetrazole ring structure and E is a hydrogen, alkyl or aryl non-functional in polymerization which comprises reacting said salt in an aqueous medium in the presence of a tetra-alkylated azo-bis-acetonitrile catalyst at elevated temperature under deaerated conditions.

2. The process of claim 1 wherein said compounds are selected from

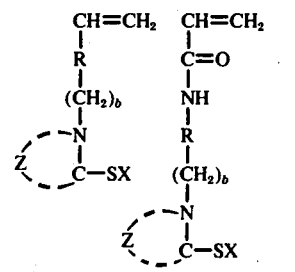

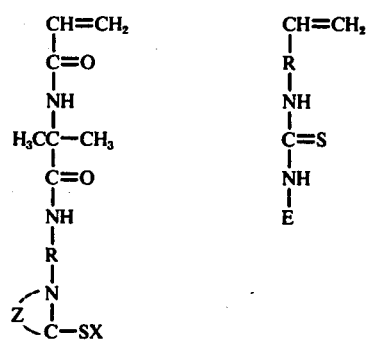

wherein b may be 0 or 1, said tetra-alkylated azo-bis-acetonitrile catalyst is 2,2'-azo-bis-(2-methylpropionitrile) and said elevated temperature is in the range of about 50° to 80° C.

3. The process of claim 2 wherein R is phenyl and b is selected from zero and one.

4. The process of claim 2 wherein the salt of 1-(p-vinylphenyl)-1,2,3,4-tetrazole-5-thiol is polymerized under deaerated conditions with heating to yield poly[1-(p-vinylphenyl)-1,2,3,4-tetrazole-5-thiol].

5. The process of claim 2 wherein the salt of 1-(p-vinylbenzyl)-1,2,3,4-tetrazole-5-thiol is polymerized under deaerated conditions with heating to yield poly[1-(p-vinylbenzyl)-1,2,3,4-tetrazole-5-thiol].

6. The process of claim 2 wherein the salt of 1-(m-acrylamidophenyl)-1,2,3,4-tetrazole-5-thiol is polymerized under deaerated conditions with heating to yield poly[1-(m-acrylamidophenyl)-1,2,3,4-tetrazole-5-thiol].

* * * * *